Aug. 5, 1952  E. R. PRICE  2,605,874
CLUTCH AND TRANSMISSION OPERATING MECHANISM
Filed April 9, 1947  6 Sheets-Sheet 1

INVENTOR.
EARL R. PRICE
BY
H. O. Clayton
ATTORNEY

Aug. 5, 1952  E. R. PRICE  2,605,874
CLUTCH AND TRANSMISSION OPERATING MECHANISM
Filed April 9, 1947  6 Sheets-Sheet 2

INVENTOR
EARL R. PRICE
H. O. Clayton
ATTORNEY

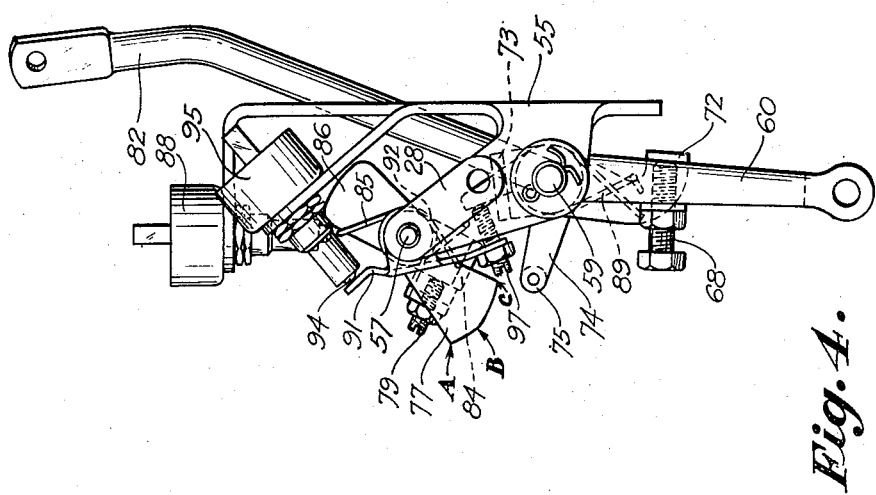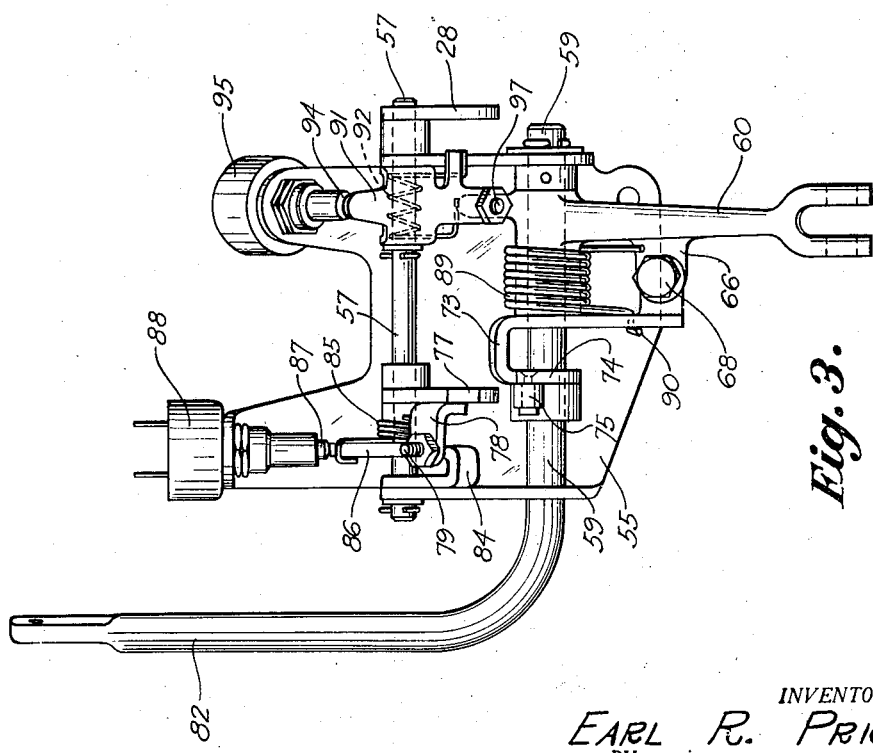

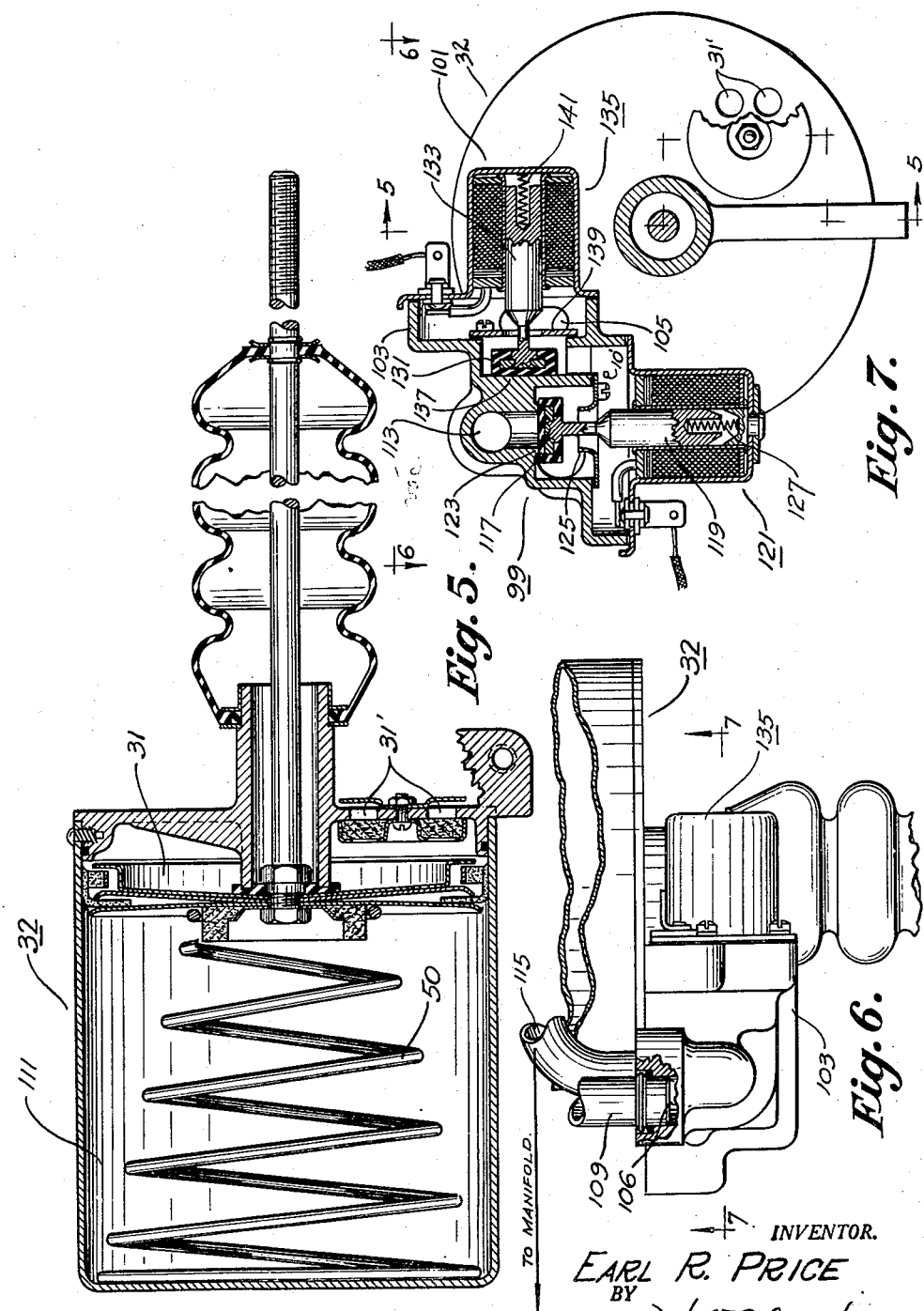

Aug. 5, 1952 E. R. PRICE 2,605,874
CLUTCH AND TRANSMISSION OPERATING MECHANISM
Filed April 9, 1947 6 Sheets-Sheet 5

Inventor
EARL R. PRICE
H. O. Clayton
ATTORNEY

Aug. 5, 1952     E. R. PRICE     2,605,874
CLUTCH AND TRANSMISSION OPERATING MECHANISM
Filed April 9, 1947     6 Sheets-Sheet 6

INVENTOR
EARL R. PRICE
ATTORNEY

Patented Aug. 5, 1952

2,605,874

UNITED STATES PATENT OFFICE 2,605,874

CLUTCH AND TRANSMISSION OPERATING MECHANISM

Earl R. Price, South Bend, Ind., assignor to Bendix Aviation Corporation, South Bend, Ind., a corporation of Delaware Application April 9, 1947, Serial No. 740,430

7 Claims. (Cl. 192—.092)

This invention relates in general to the power transmission mechanism of the power plant of an automotive vehicle and in particular to power and manually operated means for operating the change speed transmission of said power plant and for operating the throttle and the friction clutch to facilitate the operation of the transmission.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission and the operation of the throttle and friction clutch to facilitate said settings, being effected by power means if the driver elects this operation of the mechanism.

A further object of my invention is to provide, in an automotive vehicle including a fluid coupling, an accelerator, a friction clutch, an engine controlling throttle, a three speeds forward and reverse transmission, and a gear shift lever, means for operating and for facilitating the operation of said transmission, said means including power means, comprising two separate pressure differential operated motors one of which is automatically operable, when the gear shift lever is placed in a certain position and after the accelerator is released, to establish the transmission either in its second gear setting or its high gear setting depending upon the speed of the vehicle, the friction clutch and the throttle being operated by the other of said motors to facilitate this operation of the transmission, said means further including manually operated means for effecting any one of the gear settings of the transmission.

Another object of my invention is to provide, in an automotive vehicle including a power plant comprising a fluid coupling, a friction clutch, a gear shift lever, an engine controlling throttle, a vehicle speed responsive governor and a change speed transmission, manually and power operated mechanism for operating the transmission to alternately effect two of its settings and for operating the throttle and clutch to facilitate said operation of the transmission, said mechanism including a double acting pressure differential operated motor operably connected to the transmission and a single acting pressure differential operated motor operably connected to the clutch and throttle, said motors being operative, in one cycle of operations, to disengage the clutch, the throttle being held closed during said operation, then operate the transmission to establish one or the other of the aforementioned two settings, then re-engage the clutch in a plurality of stages of operation, and one of the principal objects of my invention is to include in said mechanism a simple electrical means operative, with certain operations of switches operated by the gear shift lever, the governor, the accelerator, and one of the motors, to initiate and complete the aforementioned cycle of operations of said motors.

The principal object of my invention however is to provide, in the power plant of an automotive vehicle, power means for shuttling the change speed transmission of the vehicle back and forth between two of its settings, the throttle and friction clutch of the power plant being operated to facilitate said operation of the transmission, said power means including two separate motors, one for operating the clutch and throttle and the other for operating the transmission, the operation of the transmission and incidental operation of the throttle and clutch being effected in one cycle of operations.

Other objects of the invention and desirable details of construction and combination of parts of the aforementioned mechanism, including the provision of a transmission controlling dash pot mechanism, will become apparent from the following description of a preferred embodiment of my invention, which description is taken in conjunction with the accompanying drawings, in which:

Figure 3 is a front view disclosing details of certain of the controls operated by one of the motors and also disclosing the accelerator operated switch of my invention;

Figure 4 is a side view of the mechanism disclosed in Figure 3;

Figure 5 is a sectional view, taken on the line 5—5 of Figure 7, disclosing details of the clutch and throttle operating pressure differential operated motor of my invention;

Figure 6 is a view, partly in section and taken on the line 6—6 of Figure 7, disclosing details of the air transmitting ducts constituting part of the motor unit disclosed in Figures 5 and 7;

Figure 7 is a view, largely in section, disclosing details of the solenoid operated valves for controlling the operation of the motor unit in Figure 5;

Figure 1:
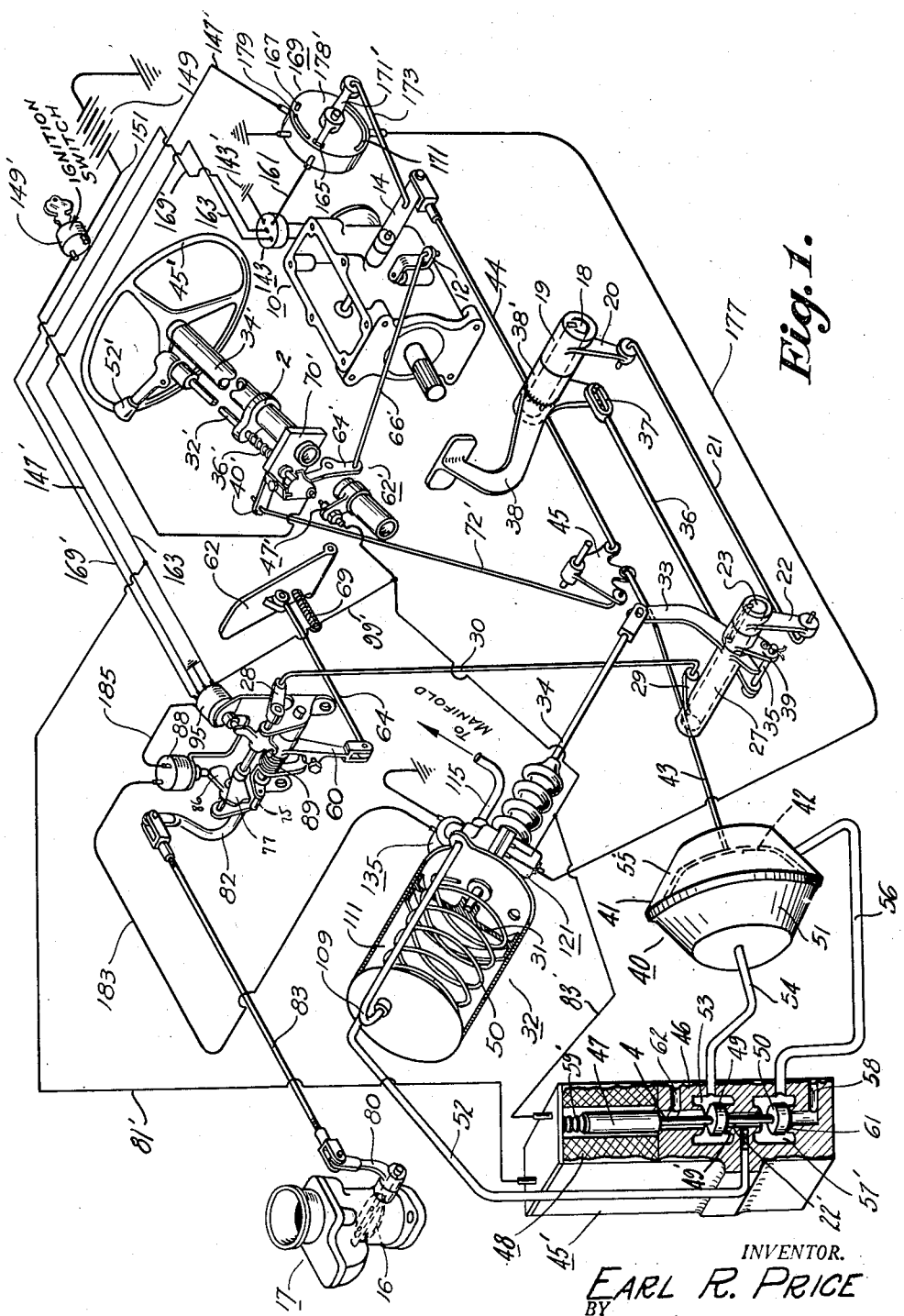
Figure 1 is a diagrammatic view of my invention disclosing the principal features thereof.

Referring now to Figure 1 disclosing a preferred embodiment of my invention, a three speeds forward and reverse transmission 10 of any well known design is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14, for operating the engine throttle valve 16 of the carburetor 17, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings. The mechanism of my invention also preferably includes, in the power plant of the vehicle, a fluid coupling such for example as that which was incorporated in several 1941 and 1942 passenger vehicles and said coupling includes an impeller and a vaned rotor the latter serving to drive the aforementioned driving plate of the clutch.

The friction clutch, not shown, is operably connected to a clutch throw out shaft 18 to which is keyed a sleeve 19; and to crank 20, fixedly secured to said sleeve, there is pivotally connected a rod 21. The rod 21 is pivotally connected to a crank 22 which is keyed to a shaft 23. A sleeve 27 covering the shaft 23 is operably connected to a crank 28 by means of a crank 29 fixedly secured to said sleeve and a rod 30 which is pivotally connected to the cranks 28 and 29.

The sleeve 27 is operably connected to a piston 31 of a clutch and throttle operating pressure differential operated motor 32, by means of a two-armed crank 33 fixedly connected to said sleeve and by means of a rod 34 pivotally connected at one of its ends to the longer arm of the crank 33 and secured at its other end to the piston. The shorter of the two arms of the crank 33 abuts a pin 35 which is preferably rotatably mounted, at one of its ends, in one end of a rod 36, said rod being connected at its other end by a lost motion connection 37, to a manually operable clutch pedal 38. This pedal constructed as a two-armed crank member, is rotatably mounted on the shaft 18 and is fixedly secured to a sleeve 38' which is also rotatably mounted on said shaft. The other end of the pin 35 is pivotally connected to a crank 39 which is keyed to the shaft 23.

There is thus provided manually and power operated means for operating the clutch, the pedal 38, by virtue of the operation of the lost motion connection 37, remaining stationary when the motor 32 is energized to disengage the clutch.

Describing now that part of the power means of my invention serving to operate the transmission, there is provided a double acting pressure differential operated motor 40 including a casing 41 and a diaphragm 42, the latter being preferably connected to a three-armed transmission operating crank 45. As is disclosed in Figure 1, one of the arms of the crank 45 is pivotally connected to a crank 40' by a link 72' and the other two arms of the crank 45 are pivotally connected to the links 43 and 44. A power operated double three-way valve 45' serves to control the operation of the motor 40, said valve including a casing 46 bored to receive a reciprocable valve member 4 extending from one end of the armature 47 of a solenoid 48. As will be described hereinafter, valve members 49 and 50 secured to the member 46', serve to control the flow of air into and from the motor 40.

Briefly describing the operation of the transmission operating motor 40 and its control valve 45, when the solenoid 48 is energized, an operation which is effected as a part of the operation of establishing the transmission in high gear, the valve members 49 and 50 are moved to the positions disclosed in Figure 1, thereby connecting a control chamber 51 of the motor 40 with a chamber 111 of the motor 32 via a conduit 52, valve chambers 22' and 53 and a conduit 54. A chamber 55' of the motor 40 is at this time vented to the atmosphere via a conduit 56, a valve chamber 57' and a duct 58. When the solenoid 48 is deenergized to establish the transmission in its second gear setting, a spring 59' serves to move the armature 47 downwardly to seat the valve members 49 and 50 upon seats 49' and 61, respectively, thereby venting the motor chamber 51 to the atmosphere via conduit 54, valve chamber 53 and duct 62 and connecting the motor chamber 55' with the source of vacuum, that is, chamber 111 of motor 32, via conduit 56, valve chambers 57' and 22' and conduit 52.

Describing now that part of the mechanism of my invention which is actuated by a manually operated gear shift lever 52', Figure 1, said mechanism includes a rotatable and bodily movable shaft 32' extending alongside the steering column 34' of the vehicle. As is disclosed in Figures 1, 8 and 9, the shaft 32' is biased downwardly by a spring 36' positioned between a stop 2 mounted on the steering column and a crank member 40' which is operably connected to said shaft by means of a clutch mechanism 42' described hereinafter. The shift lever 52' mounted beneath the steering wheel 45' is so connected to the shaft 32' that a rotation of said lever in a plane parallel to said wheel effects a rotation of said shaft about its longitudinal axis in the operation of either neutralizing the transmission or establishing the same in a gear setting; and this connection between the shift lever and shaft 32' is also such that the cross-shift movement of the shift lever, that is the movement in a plane perpendicular to the plane of the steering column, results in a movement of the shaft 32' to either effect a shift rail selecting operation of the crank 12 or effect a declutching operation of the clutch 42' and a closing of a selector switch 47' to prepare the mechanism for its power operation.

Describing the aforementioned clutch mechanism 42', said mechanism includes a member 44' sleeved over the lower end of the shaft 32', said member being permanently secured in place to the crank 40'. The lower end portion of the member 44' is provided with a flange 46' which is recessed at 48', Figure 8, to provide a keyway for a key portion 50' of a spool-shaped end portion of a clutch member 52', said member being sleeved over and drivably connected by splines 54' to the end portion 56' of the shaft 32'. A nut 58', threaded on the end of the shaft portion 56', serves as a stop for the clutch mechanism which is biased downwardly by the operation of the spring 36'.

The upper arm 60' of a bell crank lever 62' fits within the spool-shaped portion of the clutch member 52' and the lower arm 64' of the said lever is pivotally connected, by a link 66', to the shift rail selecting crank 12. As is disclosed in Figure 8, the spring 36' serves to bias the clutch 42' and shaft 32' as a unit downwardly, the movement being limited by a stop 68', Figure 9, constituting a part of a steering column mounted bracket member 70'; and in this position of the clutch 42' the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is, a selection of the low and reverse gear shift rail of the transmission, the driver lifts the shift lever 52' upwardly in a plane perpendicular to the plane of the steering wheel; and this operation serves to rotate the bell crank lever 62' in a counterclockwise direction, Figure 8, the spring 36' being compressed and the flange 46', Figure 9, being moved into engagement with the stop 68'. To actuate the shift rail operating crank 14 to neutralize the transmission or establish the same in any one of its four gear ratio settings, the driver rotates the shift lever 52' in a plane parallel to the plane of the steering wheel thereby effecting an angular movement of the crank 40' which is preferably connected to the crank 14 by force transmitting means including link 72', the aforementioned three-armed lever 45 and the link 44.

There is thus provided, by the above described mechanism, means for manually operating a three speeds forward and reverse transmission; and in this manual operation of the transmission the shift lever 52' is movable to six different positions, said selective movement outlining the letter H.

Referring now to Figures 3 and 4 there is disclosed therein details of certain other controls of the mechanism disclosed in Figure 1. A support member 55 serves as a mounting for a shaft 57 and a shaft 59, said shafts being journalled in the sides of said support member. The shaft 59 is operably connected to the throttle valve 16 by cranks 80 and 82 and a link 83. A two-armed crank 60, rotatably mounted on the shaft 59 and operably connected to the accelerator 62 of the car by a link 64 is provided with a laterally extending flange 66 within which is adjustably mounted stop member 68. This stop member is biased, by the operation of an accelerator return spring 69, into engagement with a flange member 72 extending laterally from a U-shaped fitting 73 fixedly secured to the shaft 59. From the fitting 73 there extends a flange 74 which is provided at its end with a roller member 75. This roller member is contacted by a cam 77 which is fixedly mounted on the shaft 57; and mounted alongside the cam 77 there is provided a support 78 which is also fixedly mounted on the shaft 57. There is adjustably mounted in the support 78 a set screw 79 adapted at its inner end to contact a U-shaped member 84 which is rotatably mounted on the shaft 57 and which is biased clockwise into engagement with the set screw 79 by a spring 85. A cam 86, secured to the member 84, contacts a pin 87 extending from the movable contact, not shown, of a breaker switch 88; and this contact is biased, by a spring, not shown, to its switch open position and is moved to its switch closed position by the spring operated cam 86 which is shaped to effect a closing of the switch during a part of the clutch engaging movement of the motor piston 31. There is provided by the switch 88 and the cam means for operating the same, means for controlling the operation of a choke valve operating solenoid 135, Figure 7, to effect a controlled clutch engaging operation of the motor 32. The parts, including the contour of the face of the cam 86, are preferably so constructed and arranged and so operative that the solenoid 135 is energized, to move a valve member 131 away from a seat 137, during the clutch engaging movement of the piston 31 said operation being effected just as the piston reaches the point of clutch plate contact; and as stated above the parts are also so constructed and arranged and so operative that the switch 88 is subsequently opened, to effect a de-energization of the solenoid 135, during said clutch engaging movement of said piston. When the valve 131 is moved off of a seat 139, Figure 7, air rushes into the motor 32 at a relatively high rate to thereby effect a relatively rapid clutch engaging movement of the clutch driven plate, and when the valve 131 is seated on the seat 139 air flows into the motor 32 via a relatively small opening 10'. The solenoid 135 and valve means for controlling the operation of the motor 32, are described in greater detail hereinafter.

Continuing the description of the mechanism disclosed in Figure 3 a coil spring 89, sleeved over the hub of the crank 60, is connected at one of its ends 90 to the member 73 and the other end of said spring abuts the outer face of the flange 66 on said crank. There is thus provided by the spring 89 and cooperating parts including the cam 77, means, interconnecting the accelerator and throttle whereby the accelerator may be depressed without effecting an opening of the throttle when the motors 32 and 40 are energized to successively disengage the clutch and operate the transmission; for with the first increment of clutch disengaging movement of the piston 31, the cam 77 is rotated counterclockwise, Figure 4, thereby providing, by its end portion A, B a stop to prevent a clockwise rotation, that is, throttle opening movement, of the accelerator operated flange 74. And it is to be noted at this juncture that when the accelerator is depressed to cock the spring 89 and the motor 32 is de-energized to effect a re-engagement of the clutch, the cam 77 is rotated clockwise, Figure 4, to effect a controlled opening of the throttle as the clutch plates move into contact with each other, a segment B, C of said cam being shaped to effect this operation. Preferably all points along the segment A, B of the cam 77 are equally distant from the center of rotation of said cam; and the radius of the cam from the point B to the point C progressively decreases. There is thus provided, by the operation of the sector A, B of the cam 77, a stop means operative to prevent an opening of the throttle when the clutch is being disengaged and during the engagement of the clutch as the driven clutch plate moves up to a point just short of engagement with the driving clutch plate; and the subsequent operation of the segment B, C of said cam serves to make possible a progressively increased opening of the throttle, by the operation of the accelerator loaded spring 89, as the clutch plates move into driving engagement with each other.

Figure 12:
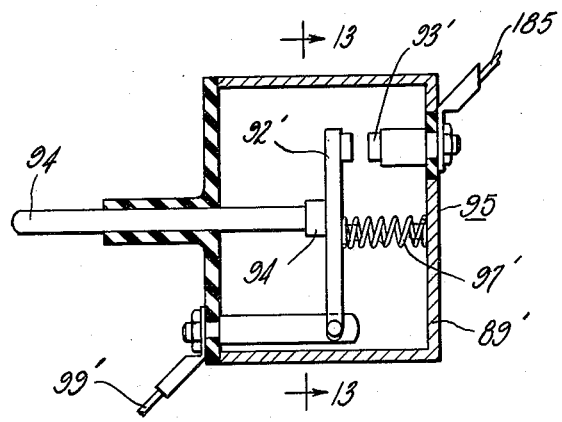
Figure 12 is a sectional view disclosing in detail the accelerator operated breaker switch mechanism of my invention; and, Figure 13 is a plan view of the switch mechanism of Figure 12.
Figure 13:
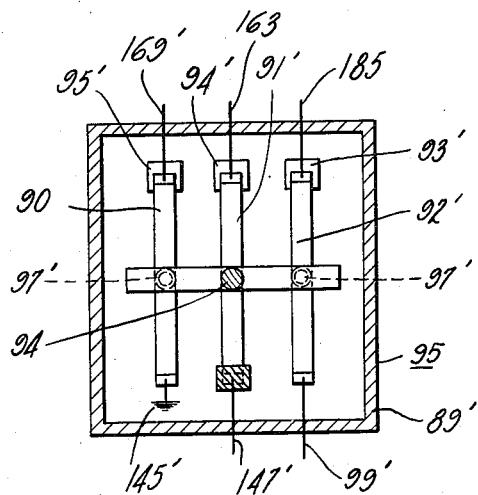

Completing the description of the mechanism of Figure 3, a switch operating member 91, rotatably mounted on the shaft 57, is biased, by a coil spring 92, to rotate in counterclockwise direction, Figure 4; and the lower end of the member 91 is adjustably connected to the upper arm of the two-armed crank 69 by means of a set screw 97 which is adjustably mounted on the member 91. The upper end of the switch operating member 91 abuts the lower end of a pin 94 which is connected to the movable contact of a cutin switch mechanism 95. The breaker switch 88 is of standard construction accordingly the same is not disclosed in detail; and the switch mechanism 95 is disclosed in detail in Figures 12 and 13. This mechanism includes a casing 89' housing three movable contacts 90, 91' and 92' pivotally mounted, at one of their ends, to posts extending from the casing; and said posts are electrically connected, respectively, to the casing to provide a ground connection, to the conductor 147' and to a conductor 99' connected to the switch 47'. Fixed contacts 93', 94' and 95' mounted in the casing 89' are electrically connected, respectively, to a conductor 185 connected to the switch 88, a conductor 163 and a conductor 169'. A bar 87' laid upon the contacts 90, 91' and 92' is preferably connected to the pin 94 by a universal joint 94; and springs 97', interposed between said contacts and the base of the casing 89', serve to bias the contacts out of engagement with the fixed contacts of the switch mechanism.

There is thus provided by the cutin switch mechanism 95, three separate switches 90, 95'; 94', 91; and 92', 93', all of which are closed when the accelerator is released and opened by the springs 97' when the accelerator is depressed. The switch 88 preferably includes a movable contact and a fixed contact, the movable contact being biased to its switch open position by a spring within the switch.

The valve means for controlling the operation of the motor 32 is disclosed in detail in Figure 7 and includes a three-way valve unit 99 and a choke valve unit 101. Both units are housed within a casing 103 preferably mounted on the casing of the motor 32. The casing 103 is preferably ported at 105 to provide a vent to the atmosphere, at 106 to receive a duct 109 leading to a control compartment 111 of the motor, and at 113 to receive a conduit 115 leading to the intake manifold of the internal combustion engine of the vehicle or other source of vacuum. The three-way valve unit 99 includes a valve member 117 operably connected to the armature 119 of a solenoid 121 which is secured to the casing 103. When the solenoid 121 is energized, the valve member 117 is moved downwardly, Figure 7, to leave a seat 123 and abut a seat 125; and when said solenoid is de-energized a spring 127 serves to return the valve member to its seat 123. The choke valve unit 101 includes the aforementioned valve member 131 which is operably connected to the armature 133 of a solenoid 135 secured to the valve casing 103. As previously briefly described, when the solenoid 135 is energized, the valve member 131 is moved off of a seat 137 onto a seat 139; and when the solenoid 135 is de-energized a spring 141 serves to return the valve member 131 to its seat 137.

Figure 2:
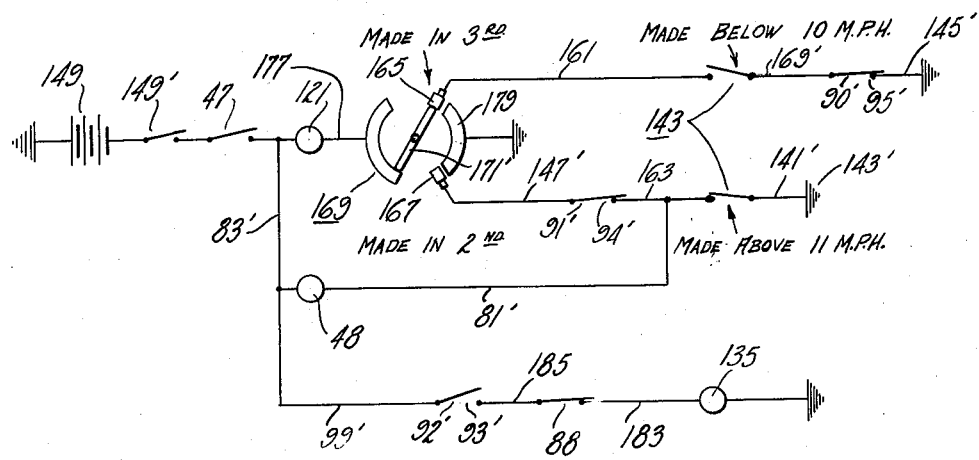
Figure 2 is a wiring diagram of the electrical mechanism disclosed in Figure 1.

The electrical means for controlling the operation of the solenoids 48, 121 and 135 constitutes one of the most important features of my invention, said electrical means being disclosed in Figures 1 and 2. Describing this control means, the movable contact 147 of a selector switch 143, Figure 11, operated by a vehicle speed responsive centrifugally operated governor 145 is grounded at 143', said ground connection including a conductor 141'; and said movable contact is also electrically connected, by the conductor 163, with the contact 94' of the accelerator operated switch 91', 94'. As described above, the other contact 91' of the latter switch is wired, by a conductor 147', to a fixed contact 167 of a rotary selector switch 169 operated by the motor 40. As is apparent from an inspection of Figure 11 the movable contact 147 is moved, by an operation of the centrifugal weights, into contact with fixed contacts 159 and 159' when the vehicle is traveling above governor speed, that is, the speed of the vehicle to effect a high gear operation of the shifter mechanism of my invention; and said contact 147 is biased downwardly by a spring 148, to the positions disclosed in said figure.

A fixed contact 157 of the governor switch 143 is wired, by a conductor 161, to a contact 165 of the switch mechanism 169; and the movable contact 147 of the governor switch 143 is electrically connected, by a fixed contact 199' and the conductor 169', to the aforementioned contact 95' of the accelerator operated switch 90, 95'. As described above, the contact 90 of the latter switch is preferably wired, by a conductor 145', to ground. A movable contact 171' of the switch 169, connected to the transmission operated crank 14 by a link 173, is contactable at one of its ends with the contacts 165 and 167 of said switch and also with a grounded contact 179 of the switch; and at its other end said movable contact 171' is at all times in contact with a conductor 171 of the switch 169. The conductor 171 is preferably electrically connected to the solenoid 121 by a conductor 177. As disclosed in Figures 1 and 2 the movable contact 171' is wired in series with a grounded battery 149, the ignition switch 149' of the car, the manually operated selector switch 47', and the solenoid 121. As disclosed in Figure 2, the switch 92', 93' of the accelerator operated switch mechanism 95 is preferably connected in series with the choke switch 88, the grounded choke solenoid 135 and the selector switch 47'; and completing the description of the electrical mechanism of my invention, the solenoid 48 is electrically connected, by a conductor 81', to the conductor 163 and by a conductor 83' to the selector switch 47'.

There is thus provided, in the valve operating solenoids 48 and 121, electro magnetic means for controlling the operation of the clutch and throttle operating motor 32 and the transmission operating motor 40; and there is also provided, in the motor operated rotary selector switch 169, the two switches of the governor operated switch 143, the two accelerator operated switches 91', 94' and 90', 95' and the selector switch 47', means for controlling the operation of the solenoids 48 and 121 to effect the above described cycle of operations of the clutch and transmission, the latter being alternately established in two of its settings. The choke valve operating solenoid 135, and the switches 92', 93' and 88 for controlling the same, may also be included in the mechanism to effect a smooth engagement of the clutch. Each of the governor operated switches 147, 159, 159' and 147, 157, 199' is wired in series with the rotary selector switch 169; said governor operated switches are electrically connected in parallel; and the solenoid 48 is electrically connected in parallel with the switch 169, the operation of said solenoid being in large measure controlled by the operation of the grounded governor operated switch 147, 157, 199'.

Figure 8:
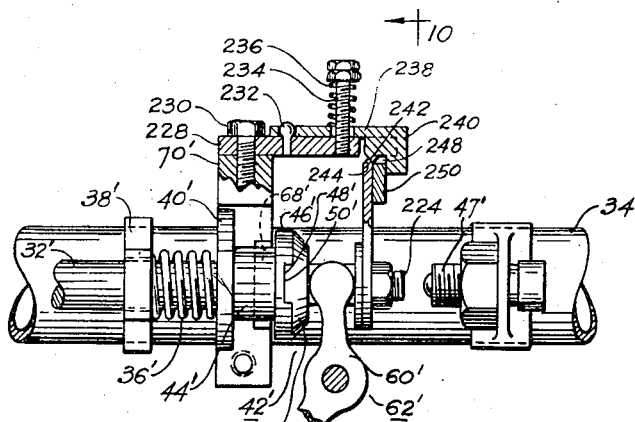
Figure 8 is an enlarged view of the mechanism at the base of the steering column, said mechanism serving to disconnect the shift lever from the power operated transmission operating linkage.
Figure 9:
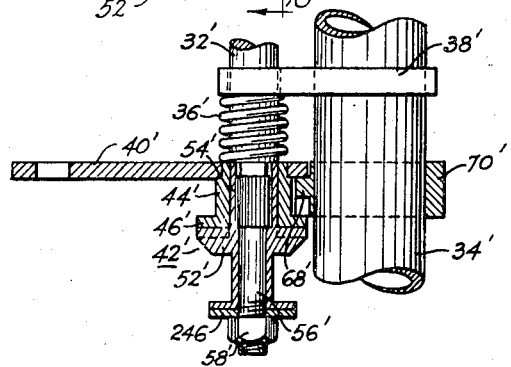
Figure 9 is a sectional view, taken on the line 9—9 of Figure 10, disclosing certain features of the mechanism disclosed in Figure 8.

Describing now the complete operation of the mechanism of my invention, and incidentally completing the description of the parts of said mechanism not heretofore described, it will be assumed that the three speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 38 to disengage the clutch and will then operate the shift lever 52 to manually effect said setting. The accelerator will then be depressed as the clutch is re-engaged to get the car under way; and after the desired car speed is reached, the shift lever and clutch pedal are again operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its automatic position, that is, one of the six selective positions of said lever. Describing the latter operation the shift lever 52, which at the time is in its second gear setting, is rotated downwardly, that is, angularly in a clockwise direction in a plane perpendicular to the plane of the steering wheel; and this operation serves to bodily move the shaft 32 downwardly until a switch operating member 224, Figure 8, is operative to close the switch 47'. This operation constitutes a declutching operation of the clutch mechanism 42', the clutch member 52' moving away from the clutch member 44', the movement of the latter being prevented by the stop 68'.

Figure 10:
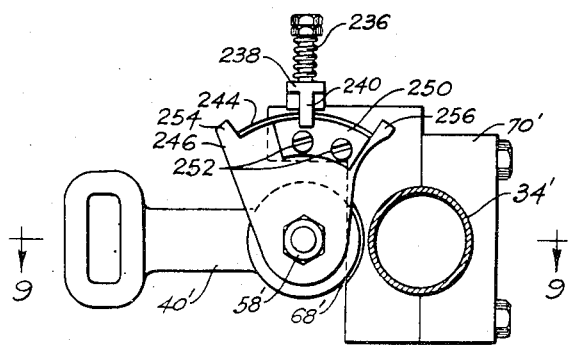
Figure 10 is a front view, taken on the line 10—10 of Figure 8, of the mechanism disclosed in Figure 8.

Referring to Figures 8 and 10 there is disclosed a latch mechanism for holding the shift lever in its automatic position, said mechanism including a relatively narrow rectangular shaped support member 228 preferably detachably secured to the bracket member 70' by a bolt 230; and there is mounted on said support member, by means of a guide pin 232, a bolt 234 and a spring 236, a movable latch member 238 shaped at its outer end to provide a relatively narrow stop member 240. Now when the shift lever 52 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56', Figure 9, between the lower flange portion of the clutch member 52' and the nut 58'; and this operation serves to position said peripheral edge portion 244 in the space indicated by the reference numeral 248, Figure 8. Incidentally, the shift rail selecting mechanism of the transmission and the cooperating transmission parts are so constructed that the crank 62' may be moved beyond its second and high shift rail selective position in effecting the above described automatic setting of the shift lever.

Now at this juncture it is to be noted, from an inspection of Figure 10, that a rectangular shaped stop member 250, secured to the outer face of the stop member 246 by screws 252, is in contact with the member 240 when the parts are in their transmission neutral position and when the spring 36' has operated to move the crank 12 to its second and high shift rail position, that is, the position preparing the transmission for either second or high gear operation. It follows therefore that the stop member 246 must be rotated clockwise in Figure 10 so that the member 250 will clear the member 240 before the shift lever may be moved downwardly to its automatic position, that is, the position to close the switch 47'; and it becomes apparent from the above description that the parts of the mechanism are so constructed and arranged that this automatic setting of the shift lever may only be effected after said shift lever has been moved to establish the transmission in its second gear setting. Referring to Figure 10 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Figure 11:
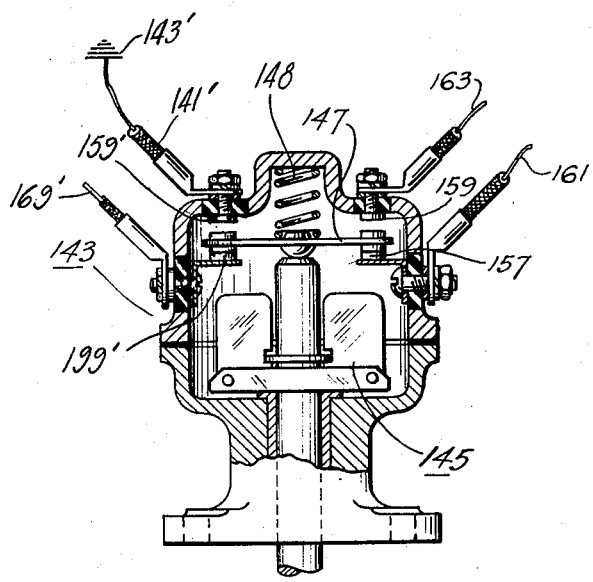
Figure 11 is a view disclosing details of the governor operated switch of the mechanism of my invention.

Continuing the description of the operation of the mechanism, the driver having moved the shift lever to its automatic position and assuming that the car is traveling above governor speed to close the switch 147, 159, 159', Figures 2 and 11, the transmission will then be automatically established in its high gear setting after the driver releases the accelerator to close the switch 91', 94'; for with this operation an electrical circuit is completed via the grounded battery 149, the ignition switch 149', the then closed selector switch 47', the solenoid 121, the then closed accelerator operated switch 91', 94', the grounded switch 147, 159', 159 of the governor operated switch 143, and the switch 167, 171' of the switch mechanism 169. An electrical circuit is also completed, via the solenoid 48, to effect an energization of the motor 40. The resulting operation of the three-way valve 99, Figure 7, effects an energization of the motor 32, the piston 31 of the said motor being then subjected to a differential of pressures to move the same to the left, Figures 1 and 5. The right side of the piston 31 is at all times subjected to the pressure of the atmosphere via screened openings 31' in one end of the motor 32; and the left side of said piston, that is, the side constituting a wall of the compartment 111, is subjected to a relatively low gaseous pressure when the three-way valve 99 is opened to interconnect said compartment with the intake manifold or other source of vacuum. When the latter valve is closed, that is, when the solenoid 121 is de-energized, the compartment 111 is vented to the atmosphere through said valve and the spring 50 within said compartment is then operative to move the piston 31 to the right, Figure 1, to permit a re-engagement of the friction clutch by the operation of its springs.

Describing now the clutch disengaging and throttle controlling operation of the motor 32, the above referred to leftward movement of the piston 31 serves to rotate the crank 20 to disengage the clutch and rotate the cam 77 counterclockwise to bring the stop portion A, B of said cam opposite the accelerator operated crank 74. Now the motor 40 is at the time energized accordingly immediately after the clutch plates are moved out of contact with each other to reverse the driving torque the above described force transmitting means interconnecting the piston 42 and the crank 14 becomes operative to move said crank and establish the transmission in its high gear setting; and as this operation of the transmission is being completed the transmission switch 169 is operated to make the switch 165, 171' and to break the switch 171', 179. The switch 167, 171' is broken during the first increment of movement of the piston 31; and the switch 171', 179 insures, through the intermediary of the vacuum controlled solenoid 121, a completion of the high gear transmission operating operation of the motor 32 once initiated and despite a certain operation of the governor operated switch 143 which breaks the electrical circuit during said operation. The latter operation of the switch 143 is effected if the car brakes are suddenly applied to bring the car down below governor speed as the motor 40 is operating to establish the high gear setting of the transmission. If this unusual operation of the mechanism is effected then the driver, in order to effect a re-engagement of the clutch after the transmission is established in high gear, must depress the accelerator to open the switch 90, 95' after the switch 165, 171' is closed. Now the breaking of the switch 90, 95' results in a de-energization of the solenoid 121 and as described above this results in a de-energization of the motor 40 and a de-energization of the motor 32 to initiate a controlled opening of the throttle.

The transmission will now remain in its high gear setting until the accelerator is again released whereupon the motors 32 and 40 will again be energized to establish the transmission in its second gear setting and to operate the clutch and throttle to facilitate said operation. If the car is then brought to a stop without neutralizing the transmission, that is, leaving the shift lever in its automatic setting, the operation of the fluid coupling of the power plant will obviate a stalling of the engine despite the relatively high gear ratio setting of the transmission, that is, its second gear setting, and despite the fact that the idling engine is at the time directly connected to the then stationary propeller shaft of the vehicle.

There is thus provided a simple, effective and efficient manually and power operated mechanism for operating the transmission, clutch and throttle of an automotive vehicle; and the clutch pedal, the shift lever and the accelerator constitute the only manually operated controls of said mechanism. With the mechanism of my invention the driver may manually operate the clutch and the three speeds forward and reverse transmission in a conventional manner, that is, by operating the clutch pedal and by effecting the H movement of the shift lever; then if he desires an automatic operation of the transmission to alternately establish the same in its second and high gear settings he has only to move the shift lever from its second gear setting to its automatic setting. Thereafter for all normal straight ahead driving of the vehicle the driver need only operate the accelerator.

Briefly reviewing the operation of the mechanism to effect this shuttling operation of the transmission between its second and high gear settings it will be assumed that the transmission is established in second gear; then when the car is speeded up above governor speed and the accelerator is released the motors 32 and 40 are energized to first disengage the clutch and simultaneously operate the cam 86 as a stop to prevent an opening of the throttle, and then operate the transmission to establish the same in its high gear setting. As the latter operation is being completed the motors are de-energized, the de-energization of the motor 32 initiating a stage operation thereof. It is to be particularly noted that with a normal operation of the car, the cycle of clutch and transmission operating and throttle controlling operations of the power means is completed once initiated and despite a depression of the accelerator during said cycle of operations.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In an automotive vehicle provided with a power plant including a throttle valve, a change speed transmission, and a friction clutch; means for operating the transmission including power means for alternately establishing the transmission in first one and then the other of two of its settings and for operating the throttle and clutch to facilitate said power operation of the transmission, said power means including a single acting fluid pressure motor operably connected to the throttle and clutch, said motor being operative to maintain the throttle closed as the clutch is being disengaged by the motor, a double acting motor operably connected to the transmission, and means for controlling the operation of said motors, including a three-way valve operable to control the flow of power fluid into both of said motors and further including a four-way valve for controlling the flow of power fluid into and from the transmission operating motor, the power fluid flowing from the latter motor passing through the three-way valve.

2. In an automotive vehicle provided with a power plant including an accelerator, a throttle valve, a change speed transmission, a gear shift lever, and a friction clutch; means for operating the transmission including power means for alternately establishing the same in first one and then the other of two of its settings and for operating the throttle and clutch to facilitate said power operations of the transmission, said power means including a single acting fluid pressure motor operably connected to the throttle and clutch and operative to maintain the throttle closed as the clutch is being disengaged, a double acting fluid pressure motor operably connected to the transmission, and means for controlling the operation of said motors including a valve for controlling the operation of both motors, a valve for controlling the operation of the transmission operating motor, the operation of the latter motor being dependent upon the operation of the former valve whereby the clutch is operated in conjunction with an operation of the transmission; together with means, including electrical means, for controlling the operation of said valves.

3. In an automotive vehicle provided with a power plant including an accelerator, an internal combustion engine, a throttle valve, a change speed transmission, a gear shift lever and a friction clutch; means for operating the transmission including power means for alternately establishing the transmission in first one and then the other of two of its settings and for operating the throttle and clutch to facilitate said power operation of the transmission, said power means including a fluid pressure motor operably connected to the throttle and clutch and operative to maintain the throttle closed as the clutch is being disengaged, a fluid pressure motor operably connected to the transmission, fluid transmitting means, including a control valve, interconnecting the latter motor with the aforementioned motor, and means for controlling the operation of said motors including a master valve for controlling the passage of power fluid through the fluid transmitting means together with means for controlling the operation of said valves.

4. In an automotive vehicle provided with a three speeds forward and reverse transmission, a throttle, a friction clutch and a gear shift lever; manually and power operated transmission, clutch and throttle operating means including means for operating the throttle and clutch to facilitate a part of the operation of the transmission, said first mentioned means including manually operated means for operating the transmission to establish the same in any one of its settings, and power means, including a clutch and throttle operating motor and a transmission operating motor, operable upon a part of the latter means and operative to alternately establish the transmission in first one and then the other of two of its settings and means for controlling the operation of said transmission operating motor to successively effect an energization and then a de-energization thereof, said control means including a master valve for controlling the operation of both motors, a valve for controlling the operation of the transmission operating motor, and electrical means for controlling the operation of said valve means including a governor operated switch mechanism comprising a plurality of switches, a rotary selector switch mechanism operated by the transmission operating motor and including a plurality of switches one of said switches being electrically connected in series with one of the governor operated switches and another of said switches being electrically connected in series with another of the governor operated switches, manually operated cut in switch means for making possible a controlling operation of the aforementioned switch mechanisms and a solenoid for controlling the transmission motor controlling valve, said solenoid being electrically connected in parallel with the rotary selector switch mechanism and being controlled in part by the governor operated switch mechanism.

5. Power means, operative in a cycle of operations, to alternately establish a change speed transmission in first one and then the other of two settings and to operate a friction clutch to facilitate said operations, said power means including a single acting fluid pressure motor adapted to be connected to a friction clutch, a double acting fluid pressure motor adapted to be connected to a change speed transmission, valve means, including a master three-way valve for controlling the operation of both motors and a double three-way valve for controlling the operation of the double acting motor, and means for controlling the operation of said valve means including a solenoid for controlling the operation of the master three-way valve, a solenoid and a spring for controlling the operation of the double three-way valve, and electrically interlocked switch means for controlling the operation of said solenoids to automatically effect first an energization and then a de-energization of said motors.

6. In a power plant including a change speed transmission and a clutch, power means operative in a cycle of operations for alternately establishing the transmission in first one and then the other of two settings and for operating the clutch to facilitate said transmission operations, including a single acting fluid pressure motor operably connected to the clutch, a double acting fluid pressure motor operably connected to the transmission, valve means, including a master three-way valve for controlling the operation of both motors and a double three-way valve for controlling the operation of the transmission operating motor, and electrical means for controlling the operation of said valve means including governor operated switch means comprising a plurality of switches, a rotary selector switch mechanism operated by the transmission operating motor and including a plurality of switches one of said switches being electrically connected in series with one of the governor operated switches and another of said switches being electrically connected in series with another of the governor operated switches, and manually operated switch means including a plurality of switches one of which is connected in series with one of the governor operated switches and another one of which is connected in series with another of the governor operated switches together with a solenoid for operating the double three-way valve, and electrical means connecting one of the governor operated switches with the solenoid and providing an electrical connection which is in parallel with the aforementioned series electrical connections.

7. In an automotive vehicle provided with a power plant including an accelerator, a gear shift lever, a vehicle speed responsive governor, a friction clutch and a change speed transmission, power means operable in a cycle of operations, for alternately establishing the transmission in first one and then the other of two of its settings and for operating the clutch to facilitate said operation of the transmission, said power means including a single acting fluid pressure motor operably connected to the clutch, a double acting fluid pressure motor operably connected to the transmission, valve means, including a master three-way valve for controlling the operating of both motors and a double three-way valve for controlling the operation of the transmission operated motor; and electrical means for controlling the operation of said valve means including two switches operated by the governor, a rotary selector switch operated by the transmission operating motor, a switch operated by the shift lever, two switches operated by the accelerator, electrical means interconnecting in series the shift lever operated switch, the selector switch, one of the accelerator operated switches and one of the governor operated switches, and other electrical means interconnecting in series the shift lever operated switch, the selector switch, the other accelerator operated switch and the other governor operated switch.

EARL R. PRICE.

REFERENCES CITED

The following references are of record in the file of this patent:

UNITED STATES PATENTS

| Number | Name | Date |
|---|---|---|
| 2,062,104 | Prince | Nov. 24, 1936 |
| 2,296,290 | Mayrath | Sept. 22, 1942 |
| 2,348,435 | Hey et al. | May 9, 1944 |